United States Patent
Cocks et al.

(10) Patent No.: US 10,371,171 B2
(45) Date of Patent: Aug. 6, 2019

(54) SYSTEM AND METHODS FOR REDUCING NOISE IN AN AIR MOVING SYSTEM

(71) Applicant: Regal Beloit America, Inc., Beloit, WI (US)

(72) Inventors: Rachele Barbara Cocks, Columbia City, IN (US); Norman Carl Golm, Jr., Fort Wayne, IN (US); Ludovic Andre Chretien, Columbia City, IN (US); Kerry Baker Shelton, Fort Wayne, IN (US)

(73) Assignee: Regal Beloit America, Inc., Beloit, WI (US)

(*) Notice: Subject to any disclaimer, the term of this patent is extended or adjusted under 35 U.S.C. 154(b) by 397 days.

(21) Appl. No.: 14/854,416

(22) Filed: Sep. 15, 2015

(65) Prior Publication Data
US 2016/0084268 A1 Mar. 24, 2016

Related U.S. Application Data

(60) Provisional application No. 62/053,572, filed on Sep. 22, 2014.

(51) Int. Cl.
*F04D 25/08* (2006.01)
*F04D 27/00* (2006.01)
(Continued)

(52) U.S. Cl.
CPC ......... *F04D 29/667* (2013.01); *F04D 25/08* (2013.01); *F04D 27/004* (2013.01); *F04D 29/665* (2013.01); *H02P 23/00* (2013.01)

(58) Field of Classification Search
CPC ...... F04D 29/667; F04D 25/08; F04D 27/004; F04D 29/665; F04D 25/06; F04D 27/002;
(Continued)

(56) References Cited

U.S. PATENT DOCUMENTS 4,171,931 A 10/1979 Harada
4,876,722 A * 10/1989 Dekker .............. G10K 11/1782
381/71.5
(Continued)

FOREIGN PATENT DOCUMENTS

DE 19938319 A1 2/2001
EP 0887787 A2 12/1998
JP H06251592 A 9/1994

OTHER PUBLICATIONS

Extended European Search Report dated Jun. 5, 2016, App. No. 15186134.1, 6 pages.

*Primary Examiner* — Alexander B Comley
*Assistant Examiner* — Benjamin Doyle
(74) *Attorney, Agent, or Firm* — Armstrong Teasdale LLP

(57) ABSTRACT

A centrifugal blower system includes a centrifugal blower assembly for generating airflow. The centrifugal blower assembly includes a housing, a motor coupled to the housing, and at least one impeller coupled to the motor. A motor controller is coupled to the motor. The motor controller is configured to receive at least one feedback parameter and to transmit instructions to the motor to control an operation of the motor based on the at least one feedback parameter. The operation of the motor is configured to reduce noise in the centrifugal blower system.

22 Claims, 6 Drawing Sheets

(51) Int. Cl.
*F04D 29/66* (2006.01)
*H02P 23/00* (2016.01)

(58) Field of Classification Search
CPC .... F04D 29/663; F04D 17/16; F04D 25/0666; F04D 27/001; F04D 27/0261; F04D 29/661; H02P 23/00; F04B 49/065; G10K 11/175; G10K 11/178–17855
USPC .... 417/26, 1, 14, 20, 22, 42, 43, 44.1, 44.2, 417/300, 312, 326, 423.1; 181/206; 381/71.1, 71.2, 71.3, 71.5, 71.7, 71.13, 381/73.1; 415/119
See application file for complete search history.

(56) References Cited

U.S. PATENT DOCUMENTS

| | | | | |
|---|---|---|---|---|
| 4,947,434 A * | 8/1990 | Ito | B06B 1/0688 | 381/71.13 |
| 4,965,832 A * | 10/1990 | Edwards | G10K 11/1784 | 381/71.14 |
| 5,010,576 A * | 4/1991 | Hill | G10K 11/178 | 381/71.9 |
| 5,018,202 A * | 5/1991 | Takahashi | G10K 11/1784 | 381/71.11 |
| 5,052,888 A * | 10/1991 | Bolton | F04D 29/424 | 415/119 |
| 5,336,046 A * | 8/1994 | Hashimoto | B60H 1/00471 | 415/119 |
| 5,399,068 A * | 3/1995 | Park | F04D 29/4226 | 415/204 |
| 5,492,456 A * | 2/1996 | Knight | F04D 29/626 | 248/604 |
| 5,526,432 A * | 6/1996 | Denenberg | F04D 29/663 | 381/71.14 |
| 5,567,127 A * | 10/1996 | Wentz | A47L 7/00 | 415/119 |
| 5,583,943 A | 12/1996 | Ohashi et al. | | |
| 5,601,400 A * | 2/1997 | Kondo | F04D 29/4226 | 415/119 |
| 5,602,926 A * | 2/1997 | Ohashi | G10K 11/178 | 381/71.5 |
| 5,636,287 A * | 6/1997 | Kubli | F04D 29/663 | 381/71.2 |
| 5,692,054 A * | 11/1997 | Parrella | F04D 29/665 | 381/71.3 |
| 5,813,831 A * | 9/1998 | Matsunaga | F04D 29/162 | 415/173.6 |
| 6,039,532 A * | 3/2000 | McConnell | F04D 29/422 | 415/119 |
| 6,078,671 A * | 6/2000 | Kawanishi | F01N 1/065 | 381/71.1 |
| 6,092,988 A * | 7/2000 | Botros | F04D 29/4213 | 415/191 |
| 6,107,706 A * | 8/2000 | Neckermann | F04D 29/668 | 310/43 |
| 7,282,873 B2 * | 10/2007 | Abali | F04D 25/166 | 318/268 |
| 7,448,382 B1 * | 11/2008 | Alexander | A61M 16/0051 | 128/204.18 |
| 7,476,079 B2 * | 1/2009 | Bartlett | F04D 29/4213 | 415/203 |
| 7,687,748 B2 * | 3/2010 | Gagas | H05B 6/1263 | 126/21 A |
| 7,931,075 B2 * | 4/2011 | Ito | B60H 1/00028 | 165/122 |
| 8,294,393 B2 | 10/2012 | Schock et al. | | |
| 8,734,097 B2 * | 5/2014 | Kenyon | A61M 16/0057 | 415/199.2 |
| 8,800,557 B2 * | 8/2014 | Andreiux | A61M 16/10 | 128/200.24 |
| 8,855,329 B2 * | 10/2014 | Slapak | F24F 13/24 | 181/201 |
| 9,157,441 B2 * | 10/2015 | Dickinson | F04D 17/162 | |
| 9,533,220 B2 * | 1/2017 | Ikeda | A63F 13/06 | |
| 9,574,568 B2 * | 2/2017 | Dickinson | F04D 25/0613 | |
| 9,649,458 B2 * | 5/2017 | Andrieux | A61M 16/0051 | |
| 9,790,961 B2 * | 10/2017 | Wu | F04D 29/665 | |
| 2002/0150478 A1 * | 10/2002 | Aoki | B60H 1/00457 | 417/44.1 |
| 2004/0131465 A1 * | 7/2004 | Ochiai | F01D 9/026 | 415/206 |
| 2006/0035580 A1 * | 2/2006 | Anderson | F24F 13/1426 | 454/309 |
| 2006/0103334 A1 * | 5/2006 | Abali | F04D 25/166 | 318/67 |
| 2008/0110459 A1 * | 5/2008 | Farbarik | A61M 16/0057 | 128/204.18 |
| 2008/0187147 A1 * | 8/2008 | Berner | F24F 13/24 | 381/71.3 |
| 2008/0197794 A1 * | 8/2008 | Vermeir | H02P 6/085 | 318/400.06 |
| 2009/0007912 A1 * | 1/2009 | Lindell | A61M 16/10 | 128/204.18 |
| 2009/0137199 A1 * | 5/2009 | Jeung | F04D 27/004 | 454/230 |
| 2010/0006097 A1 * | 1/2010 | Frater | A61M 16/0057 | 128/204.18 |
| 2011/0060535 A1 * | 3/2011 | Arms | B60C 23/0411 | 702/34 |
| 2011/0227523 A1 * | 9/2011 | Grantz | H02P 25/188 | 318/724 |
| 2012/0164931 A1 | 6/2012 | Takeda et al. | | |
| 2013/0074843 A1 * | 3/2013 | Frater | A61M 16/0057 | 128/204.18 |
| 2013/0082115 A1 * | 4/2013 | May | F24F 13/1426 | 236/49.3 |
| 2013/0242504 A1 * | 9/2013 | Cartes | G05D 23/1931 | 361/679.49 |
| 2014/0246998 A1 * | 9/2014 | Chadsey | H02P 6/10 | 318/400.06 |
| 2014/0326794 A1 * | 11/2014 | Frank | F24F 11/0012 | 236/49.3 |
| 2014/0354200 A1 * | 12/2014 | Krishnamoorthy | F04D 27/001 | 318/400.06 |
| 2015/0030469 A1 * | 1/2015 | Hopkins | F04D 25/166 | 417/53 |
| 2015/0042248 A1 * | 2/2015 | Nikolov | H02P 3/12 | 318/380 |
| 2015/0104029 A1 * | 4/2015 | Cheng | G06F 1/20 | 381/71.3 |
| 2015/0179161 A1 * | 6/2015 | Fujiwara | G10K 15/04 | 381/98 |
| 2015/0356966 A1 * | 12/2015 | Yano | G10K 11/178 | 381/71.8 |
| 2016/0084268 A1 * | 3/2016 | Cocks | H02P 23/00 | 415/1 |
| 2017/0122340 A1 * | 5/2017 | Shinsato | F04D 29/665 | |

* cited by examiner

SYSTEM AND METHODS FOR REDUCING NOISE IN AN AIR MOVING SYSTEM

CROSS REFERENCE TO RELATED APPLICATION

This application claims priority to U.S. Provisional Application No. 62/053,572 filed Sep. 22, 2014, which is hereby incorporated by reference in its entirety.

BACKGROUND

The embodiments described herein relate generally to noise control and more particularly, to improving efficiency and reducing noise generated by a centrifugal fan system using active noise control and anti-noise.

There are many known noise cancellation systems used to cancel unwanted noise in a particular system. For example, there are both passive and active noise control systems. Some known passive noise reduction systems block the noise compression wave with a sound absorbing substance. This type of noise reduction does not require an external energy source to accomplish its task. Some known types of passive noise reduction include sound mufflers, enclosures, and acoustical material. Passive noise reduction tends to be more effective for high frequency noise than for low frequency noise.

Active noise control (ANC) systems are used to electronically sense and cancel undesired noise from noise producing sources such as fans, blowers, electronic transformers, engines, etc. In some known ANC systems, a sensor (such as a microphone) and an actuator (such as a speaker) are located along the same plane as the noise wave-front plane. Some known ANC systems for heating, ventilating, and air conditioning (HVAC) systems consist of a speaker that injects pressure waves (or "anti-noise") into the ductwork. The pressure waves are generally out-of-phase with the noise to facilitate canceling the noise proximate the speaker. Some of these known systems also include an error microphone to sense the amount of noise cancellation. Feedback signals from the error microphone are then transmitted to ANC control circuitry to provide a drive signal to drive the speaker to minimize the error noise signal. Active noise reduction tends to be more effective for low frequency noise than for high frequency noise.

These known noise control systems include limitations in the noise frequencies in which they are most effective, and can be labor-intensive and expensive to install due to the use of many additional components, such as, actuators, acoustic materials, etc. Furthermore, in such known systems, it is noted that the mechanical or electromechanical actuators themselves can produce unwanted noise. These known systems fail to disclose a complete solution for effective control of noise across a broad frequency range, such as that generated in an HVAC system.

BRIEF DESCRIPTION

In one aspect, a centrifugal blower system includes a centrifugal blower assembly for generating airflow. Furthermore, the centrifugal blower assembly includes a housing, a motor coupled to the housing, and at least one impeller coupled to the motor. The centrifugal blower system also includes a motor controller coupled to the motor. The motor controller is configured to receive at least one feedback parameter and to transmit instructions to the motor to control an operation of the motor based on the at least one feedback parameter. The operation of the motor is configured to reduce noise in the centrifugal blower system.

In another aspect, a centrifugal blower system includes a centrifugal blower assembly for generating airflow and a motor controller. The motor controller is configured to receive a first feedback parameter and transmit a first instruction based on the first feedback parameter. The first feedback parameter is indicative of a pressure wave moving through the airflow. The centrifugal blower system further includes a motor configured to receive the first instruction and generate at least one axis of vibration in response to the first instruction. The at least one axis of vibration is configured to cancel the pressure wave.

In yet another aspect, a method for reducing noise in a centrifugal blower system is provided. The centrifugal blower system includes a motor and a motor controller coupled to the motor. The method includes executing a first characterizing routine using the motor controller. The first characterizing routine is configured to determine an initial system characterization of the centrifugal blower system. A second characterizing routine is executed using the motor controller. The second characterizing routine is configured to determine a second system characterization of the centrifugal blower system. An instruction is transmitted to the motor. The method further includes moving the centrifugal blower system to one of the first system characterization and the second system characterization in response to the instruction.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
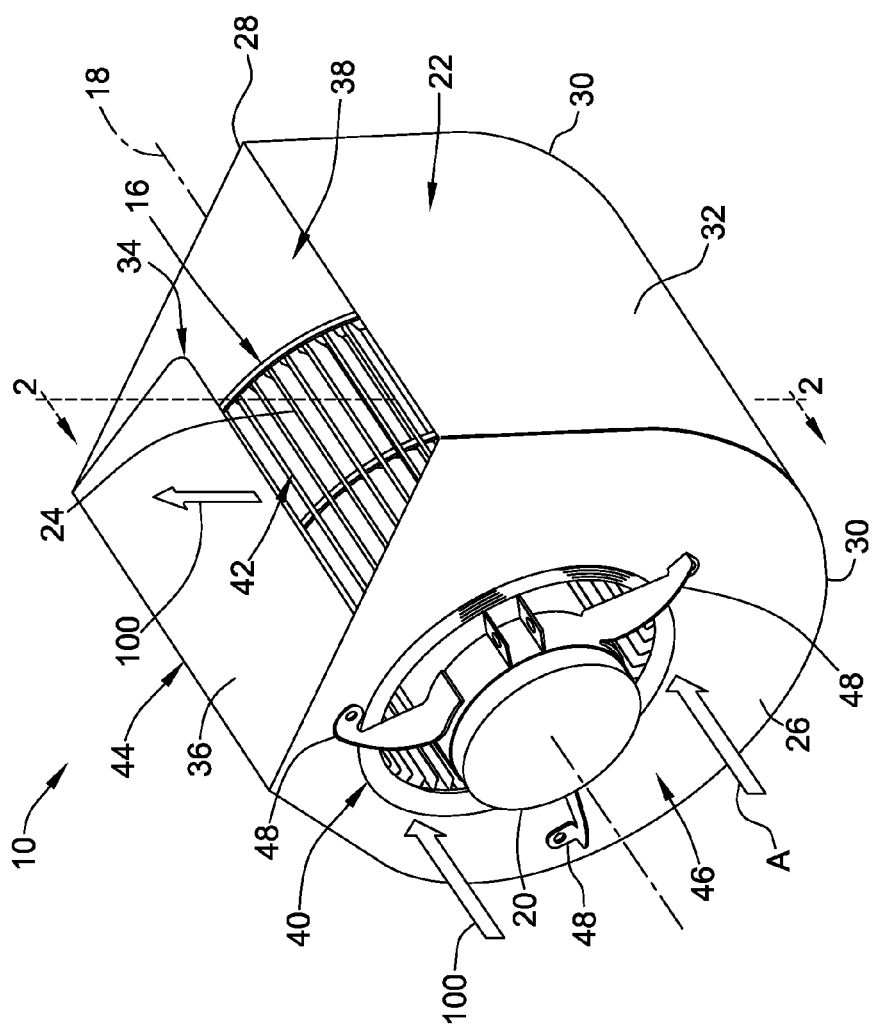
FIG. 1 is a schematic perspective of an exemplary centrifugal blower system.
Figure 2:
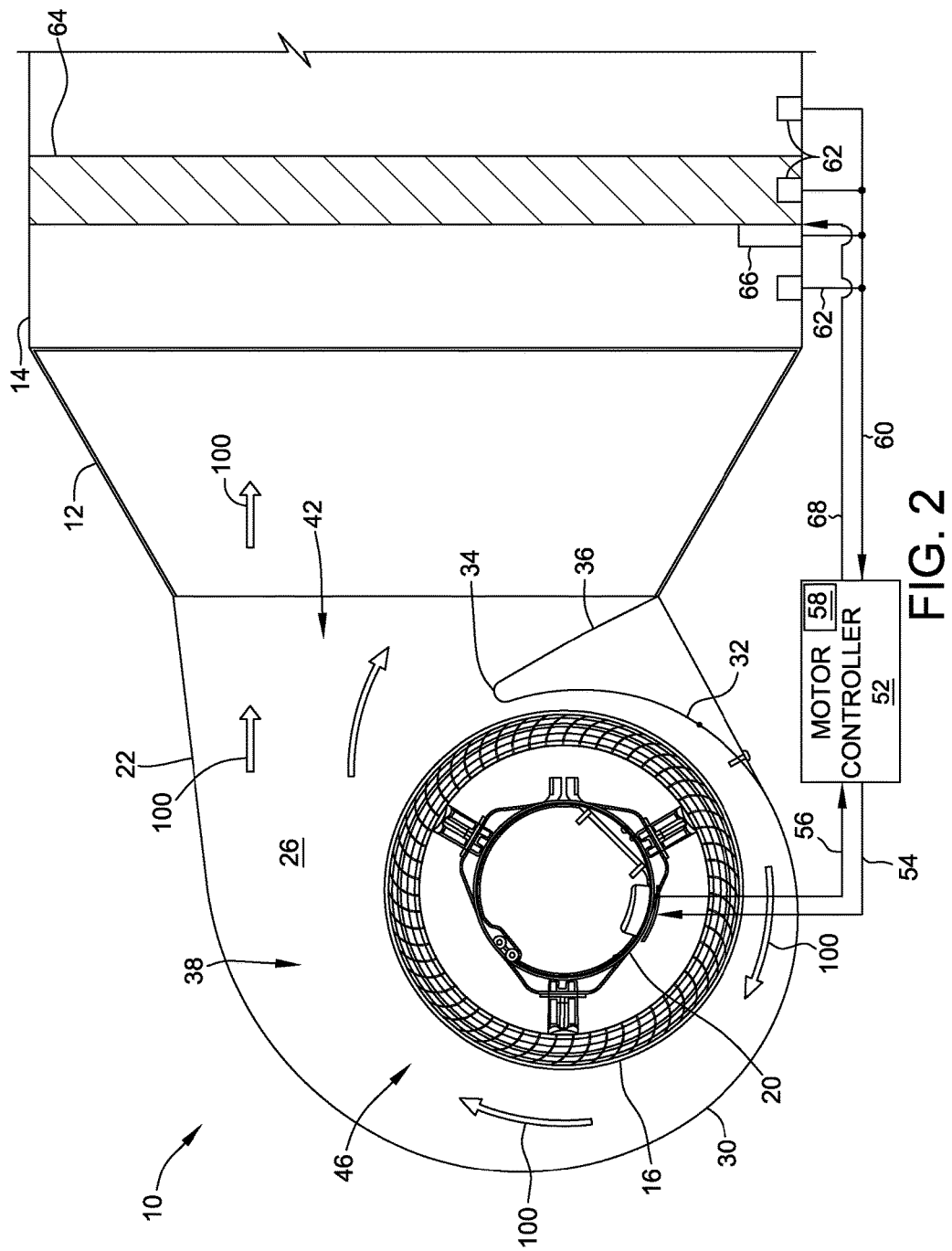
FIG. 2 is a cross-sectional view of the centrifugal blower system taken along line 2-2 of FIG. 1, including application ductwork.

FIG. 1 is a schematic perspective of an exemplary centrifugal blower system 1. FIG. 2 is a cross-sectional view of centrifugal blower system 1 taken along line 2-2 of FIG. 1, including application ductwork 14. As seen in FIG. 2, centrifugal blower system 1 can include a centrifugal blower assembly 10 and a blower expansion 12, which provides a transition between centrifugal blower assembly 10 and application ductwork 14. In the exemplary embodiment, the centrifugal blower assembly 10 includes a fluid moving element 16, such as a fan, a blower wheel, or an impeller, having an axis of rotation 18. In the exemplary embodiment, fluid moving element 16 is an impeller. Impeller 16 is coupled to a motor 20, which is configured to rotate impeller 16 about axis of rotation 18. In the exemplary embodiment, motor 20 can be any type of motor, for example, without limitation, a radial flux and an axial flux motor. The rotation of impeller 16 draws air into centrifugal blower assembly 10 along axis of rotation 18 as represented by airflow arrows 100, and expels the air radially outward into a housing 22. In the exemplary embodiment, impeller 16 is formed from a plurality of forward curved fan blades 24. Alternatively, fan blades 24 may include backward curved blades, airfoil blades, backward inclined blades, radial blades, or any other suitable blade shape that enables impeller 16 to operate as described herein. In the exemplary embodiment, the shape of fan blades 24 of impeller 16 facilitates reducing operating noise (i.e., unwanted pressure waves) generated by impeller 16. Impeller 16 is configured to produce a flow of air, or airflow 100, for a forced air system, e.g., without limitation, a residential heating, ventilating, and air conditioning (HVAC) system.

In the exemplary embodiment, housing 22 includes a first sidewall 26 and an opposite second sidewall 28 that are fabricated as generally flat, parallel sidewalls disposed at axially opposite ends of impeller 16. An outer periphery 30 of each of sidewalls 26 and 28 is shaped substantially the same and generally forms a volute shape with respect to axis of rotation 18. A volute outer wall 32 is coupled between sidewalls 26 and 28. More specifically, volute outer wall 32 is coupled to outer periphery 30 of sidewalls 26 and 28 thereby forming an increasing expansion angle for airflow 100 through housing 22. Volute outer wall 32, which extends around impeller 16, includes a cutoff portion 34 including a cutoff wall 36 that is at least partially disposed within an interior space 38 of housing 22. In alternative embodiments, housing 22 and be in any form and shape that enables centrifugal blower system 1 to function as described herein.

In the exemplary embodiment, housing 22 includes an air inlet opening 40 provided in first sidewall 26. Further, an air outlet opening 42 is defined, at least in part, by cutoff portion 34, sidewalls 26 and 28, and volute outer wall 32. In the exemplary embodiment, airflow 100 is expelled from centrifugal blower assembly 10 through air outlet opening 42. Proximate air outlet opening 42, housing 22 includes an expansion portion 44, generally defined by the portion of housing 22 extending from air outlet opening 42 away from impeller 16. Housing 22 also includes a housing portion 46, generally defined as the volute-shaped portion surrounding impeller 16. In the exemplary embodiment, each of the components of housing 22 are fabricated from any material that enables housing 22 to function as described herein, for example, without limitation, aluminum, steel, thermoplastics, fiber reinforced composite materials, or any combination thereof.

Further, in the exemplary embodiment, motor 20 of centrifugal blower assembly 10 is disposed in air inlet opening 40 and is coupled to housing 22 by a plurality of mounting arms 48. Alternatively, second sidewall 28 may include an opening (not shown) to accommodate motor 20.

As seen in FIG. 2, centrifugal blower assembly 10 is connected to blower expansion 12. In the exemplary embodiment, blower expansion 12 is fabricated from generally flat panels coupled to the periphery of expansion portion 44 of housing 22. Blower expansion 12 is fabricated from any material that enables blower expansion 12 to function as described herein, for example, without limitation, aluminum, steel, thermoplastics, fiber reinforced composite materials, or any combination thereof.

With reference to FIG. 2, centrifugal blower system 1 includes a motor controller 52 coupled to a motor 20. Motor controller 52 transmits instructions 54 to motor 20 to control an operation of motor 20, and receives feedback parameters 56 from motor 20 to determine the operational status of motor 20. In some embodiments, motor controller 52 is incorporated within motor 20. In the exemplary embodiment, motor 20 is an electric variable speed motor, such as an electronically commutated motor (ECM). Alternatively, motor 20 is a sensorless ECM, meaning motor 20 does not include sensors such as an encoder, optical sensors, or Hall sensors for determining a position or operational status of a rotor (not shown) in motor 20. Rather, in such embodiments, motor 20 generates back electromotive force (BEMF) harmonic signals that are received by motor controller 16, for example as part of feedback parameters 56, to determine the operational status of motor 20. Motor controller 52 includes a computing device 58 configured to enable motor controller 52 to perform one or more functions described herein. In particular, motor controller 52 is configured to transmit instructions 54 to motor 20 to facilitate injecting anti-noise, i.e., canceling pressure waves, into centrifugal blower system 1 based on at least one of feedback parameters 56 and feedback parameters 60 that are received by motor controller 52 from one or more sensors 62 coupled to centrifugal blower system 1. As described in more detail herein, computing device 58 is programmed to determine, based on feedback parameters 56 from motor 20 and/or feedback parameters 60 from sensors 62, instructions 54 that cause motor 20 to generate anti-noise that is out of phase with the noise sensed in centrifugal blower system 1. For example, in some embodiments, operation of motor 20 generates vibrations that are transmitted through surfaces adjacent the motor 20 such that the surfaces vibrate at a frequency configured to generate anti-noise.

In the exemplary embodiment, sensors 62 are configured to sense various conditions of airflow 100 and various physical conditions of application ductwork 14 and any airflow directors 64, for example louvers, placed in application ductwork 14. In the exemplary embodiment, sensors 62 include any number and type of various sensors, for example, without limitation, temperature sensors, accelerometers, strain gauges, flow meters, audio sensors, and pressure sensors. Sensors 62 are each configured to generate feedback parameters 60, which are fed back to motor controller 52.

Figure 3:
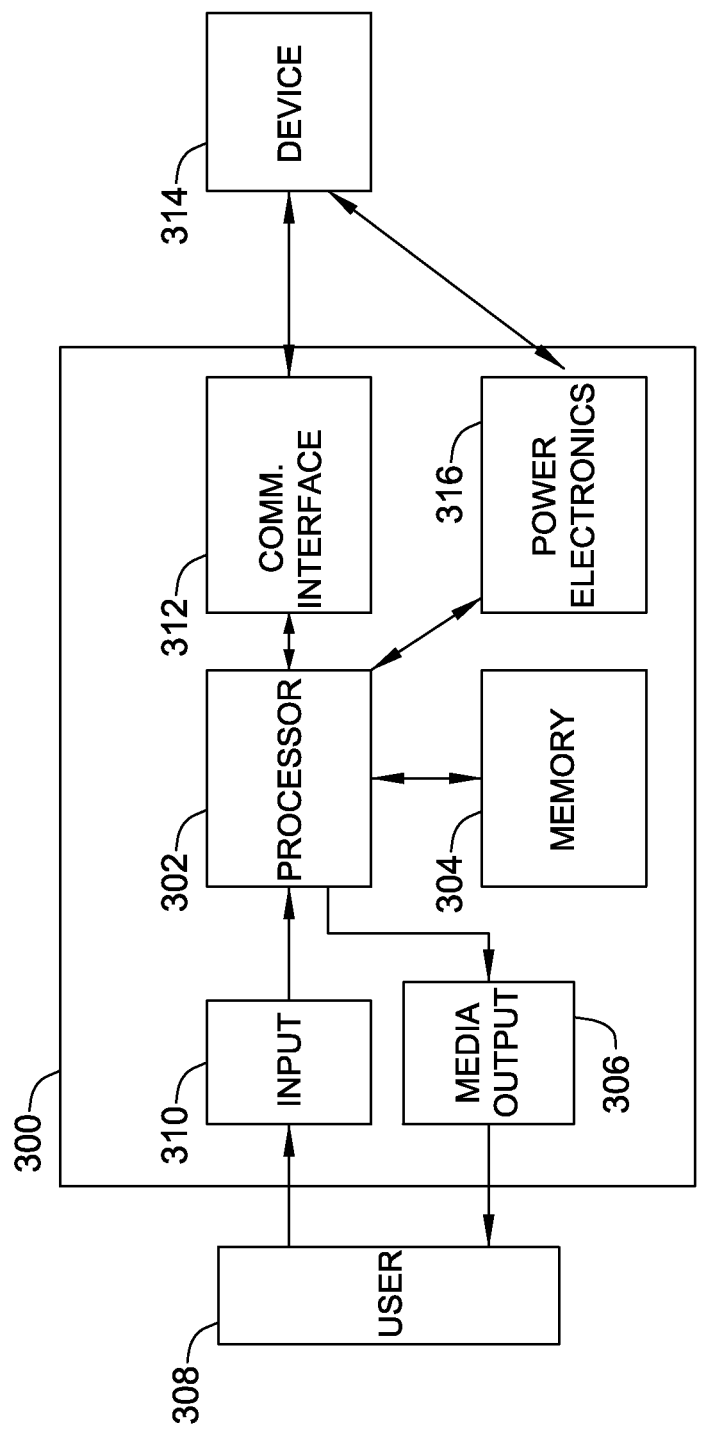
FIG. 3 is a block diagram of an exemplary computing device for use with a motor of the centrifugal blower system shown in FIG. 2.

FIG. 3 is a block diagram of an exemplary computing device 300 for use with motor 20 of centrifugal blower system 1 shown in FIG. 2. At least some components of computing device 300 are included in implementations of other devices describe herein, for example computing device 58. Computing device 300 includes a processor 302 for executing instructions. In some implementations, executable instructions are stored in a memory area 304. Processor 302 may include one or more processing units (e.g., in a multi-core configuration). Memory area 304 is any device allowing information such as executable instructions and/or other data to be stored and retrieved. In computing device 58, memory area 304 stores parameters for controlling the operation of motor 20, as described in more detail herein. Memory area 304 may include one or more computer-readable media.

In the exemplary embodiment, computing device 300 also includes at least one media output component 306 for presenting information to user 308. Media output component 306 is any component capable of conveying information to user 308. In some implementations, media output component 306 includes an output adapter such as a video adapter and/or an audio adapter. An output adapter is operatively coupled to processor 302 and operatively coupleable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones). In other embodiments, computing device 300 does not include media output component 306. For example, without limitation, some embodiments of computing device 58 (shown in FIG. 2) do not include media output component 306.

Computing device 300 includes an input device 310 for receiving input from user 308. Input device 310 may include, for example, one or more buttons, a keypad, a touch sensitive panel (e.g., a touch pad or a touch screen), and/or a microphone. A single component such as a touch screen may function as both an output device of media output component 306 and input device 310. Some embodiments of computing device 300, for example some embodiments of computing device 58 (shown in FIG. 2), do not include input device 310.

In the exemplary embodiment, computing device 300 includes a communication interface 312, which is communicatively coupleable to another device 314, for example sensors 62 and motor 20. In some embodiments, communication interface 312 is configured to enable communication through a short range wireless communication protocol such as Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals). In embodiments that communication interface 312 couples motor controller 52 to motor 20, communication interface 312 may include, for example, one or more conductors for transmitting electrical signals and/or power to and/or from motor 20. Additionally, computing device 300 may also include power electronics 316, which may be coupled, for example, to processor 302 and motor 20.

In operation, impeller 16 rotates about axis of rotation 18 to draw air into housing 22 through air inlet opening 40. The amount of air moved by centrifugal blower system 1 increases as a point on impeller 16 moves within housing 22 from cutoff portion 34 towards air outlet opening 42. Volute outer wall 32 is positioned progressively further away from impeller 16 in the direction of rotation of impeller 16 to accommodate the increasing volume of air due to the volute shape of housing 22. Impeller 16 generates high velocity airflow 100 that is exhausted from air outlet opening 42. Impeller 16 draws airflow 100 into centrifugal blower assembly 10 through air inlet opening 40 in the axial direction of motor 20 (referring to axis of rotation 18) and turns airflow 100 to a generally radial direction (referring to a radial direction generally perpendicular to axis of rotation 18). The rapid change in direction of airflow 100 causes differences in the airflow velocity and pressure between the portion of airflow 100 flowing through air inlet opening 40 and the portion within housing 22. These pressure and velocity differences cause a portion of airflow 100 to recirculate behind fan impeller 12 and form adverse flow structures within airflow 100. Recirculation is caused by a high-pressure portion of airflow 100 flowing behind impeller 16 to a low-pressure portion of airflow 100 in housing 22. These differing pressures create downstream disturbances such as buffeting that cause centrifugal blower assembly 10 to operate inefficiently and produce undesired noise.

Furthermore, structural vibrations in motor 20 due to various factors such as torque ripple and fluctuating electromagnetic forces used to excite the motor assembly generate tonal noise in the system by transmitting the vibrations to housing 22 and application ductwork 14. In addition, as airflow 100 moves through application ductwork 14, it encounters turns, bends, and airflow directors (for example louvers, exhaust vents, etc.) placed in application ductwork 14 that cause pressure fluctuations within airflow 100, which can facilitate generating adverse flow structures and reduce the efficiency of centrifugal blower system 1. The adverse flow structures also interact with application ductwork 14 to generate additional noise within centrifugal blower system 1.

Airflow 100 passes through air outlet opening 40 having a circumferential (tangent to a circle swept by impeller 16) path that causes separation of airflow 100 from volute outer wall 32 proximate expansion portion 44 of housing 22. Such separation of airflow 100 can form eddies adjacent volute outer wall 32. Similarly, eddies formed in airflow 100 adjacent volute outer wall 32 also additional cause adverse flow structures to develop in airflow 100. These adverse low structures in airflow 100 cause centrifugal blower assembly 10 to operate inefficiently and produce undesired noise downstream of centrifugal blower assembly 10.

In the exemplary embodiment, motor controller 52 operates motor 20 to generate airflow 100 through centrifugal blower system 1. Pulsating forces and other vibrations generated by motor 20 generate noise in application ductwork 14 via transmission of vibrations from motor 20 and/or via tonal resonances generated by motor 20 and impeller 16. Motor controller 52 receives feedback parameters 56 from at least one of motor 20 and feedback parameters 60 from sensors 62. In the exemplary embodiment, sensors 62 include for example, without limitation, temperature sensors that feedback temperatures of heat exchange units within the system, audio sensors that feedback tonal resonances sensed within the system, pressure sensors that feedback pressure fluctuations within the system, flow sensors that feedback flow rates of airflow 100 within the system, accelerometers for measuring vibrations in various system components, and torque sensors that feedback torque readings from motors in the system that control, for example, flow diverters, louvers, etc. Based on feedback parameters 56 and/or 60, motor controller 52 generates instructions 54 that inject electrical signals into motor 20 to facilitate generating pressure waves that are out of phase and have a substantially similar amplitude to the noise signals received via feedback parameters 56 from motor 20 and feedback parameters 60 from sensors 62. For example, without limitation, motor controller 52, for higher frequency noise, transmits instruction 54 that generate a two-node or four-node pattern in the motor structure to create a higher pole pattern of the centrifugal blower assembly 10. For low frequency noise, controller 300 transmits instruction 54 that generate a signal that can move the rotor of motor 20 axially, thereby oscillating impeller 16 to offset such low frequency noise. Thus, motor controller 52 facilitates operating motor 20 in a manner that intentionally generates at least one axis of vibration to break up the fundamental pressure waves and resonances generated in centrifugal blower system 1. In one example, motor controller 52 facilitates operating motor 20 in a manner that intentionally generates 3-axis vibrations to break up the fundamental pressure waves and resonances.

Furthermore, in the exemplary embodiment, there are specific resonances within centrifugal blower system 1 that show up at particular speeds of motor 20. These resonant frequencies vary based on the structure of centrifugal blower system 1 and, due to various factors, including, without limitation, manufacturing tolerances, air temperature, and the system static pressure, are not known. As motor controller 52 instructs motor 20 to come up to speed, motor 20 may stabilize at a speed that corresponds to resonant frequency of centrifugal blower system 1. The stabilizing speed is based on at least the torque command received from motor controller 52 and the static pressure of the system.

Figure 4:
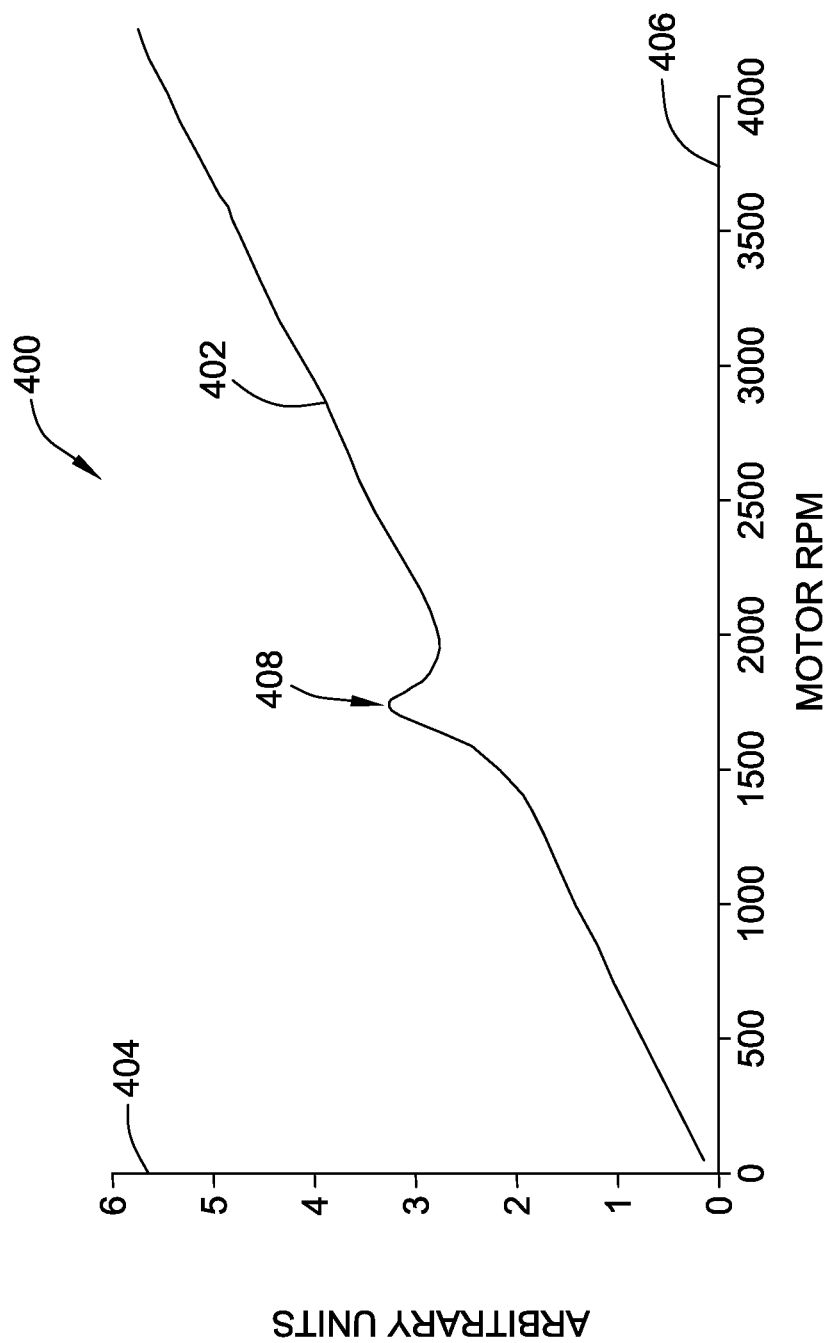
FIG. 4 is a graph generally showing a noise curve for one embodiment of the centrifugal blower system shown in FIG. 1.

FIG. 4 is a graph generally showing a noise curve 402 for one embodiment of centrifugal blower system 1 shown in FIG. 1. Y-axis 404 represents system noise in increments of 1 arbitrary unit (a.u.) extending from 0 a.u. to 6 a.u. X-axis 406 represents motor 20 rotations per minute (RPM) in increments of 500 RPMs extending from 0 RPM to 4000 RPM. In the example graph, a noise peak (resonant frequency) is generally indicated at 408, which corresponds to about 1750 RPMs for motor 20. In the exemplary embodiment, sensors 62 sense resonant frequency 408 and transmit feedback parameter 60 to motor controller 52. Motor controller 52 generates instructions 54 that change the speed of motor 20 to move along noise curve 402, thereby moving off resonant frequency 408 and reducing the noise generated in centrifugal blower system 1.

In one embodiment, motor controller 52 instructs motor 20 to increase speed to move off resonant frequency 408, thereby decreasing system noise, and increasing the flow rate of airflow 100. Alternatively, based on additional feedback parameters 60 from other sensor 62, motor controller 52 instructs motor 20 to decrease speed to move off of resonant frequency 408. For example, without limitation, in one embodiment, a feedback parameter 60 may measure temperature of an air conditioning (AC) evaporator coil (not shown), which is a part of application ductwork 14. If the speed of the motor is increased, the flow rate of airflow 100 across the AC evaporator coil increases, which can decrease the efficiency of the AC evaporator coil. In one suitable embodiment, data stored in memory area 304 of computing device 58 included in motor controller 52 is updated with the new instructions 54 that move motor 20 off resonant frequency 408. Accordingly, subsequent operation of motor 20 will result in motor controller 52 instructing motor 20 to go to a stabilizing speed that is off resonant frequency 408.

In another alternative embodiment, motor controller 52 instructs motor 20 to vary its speed by both increasing and decreasing the number of RPMs around the desired speed. Varying the number of RPMs, in both directions, facilitates moving motor 20 off resonant frequency 408, thereby decreasing system noise, and increasing airflow 100. Furthermore, varying the RPMs facilitates reducing the ability of the system to develop a resonant response.

Figure 5:
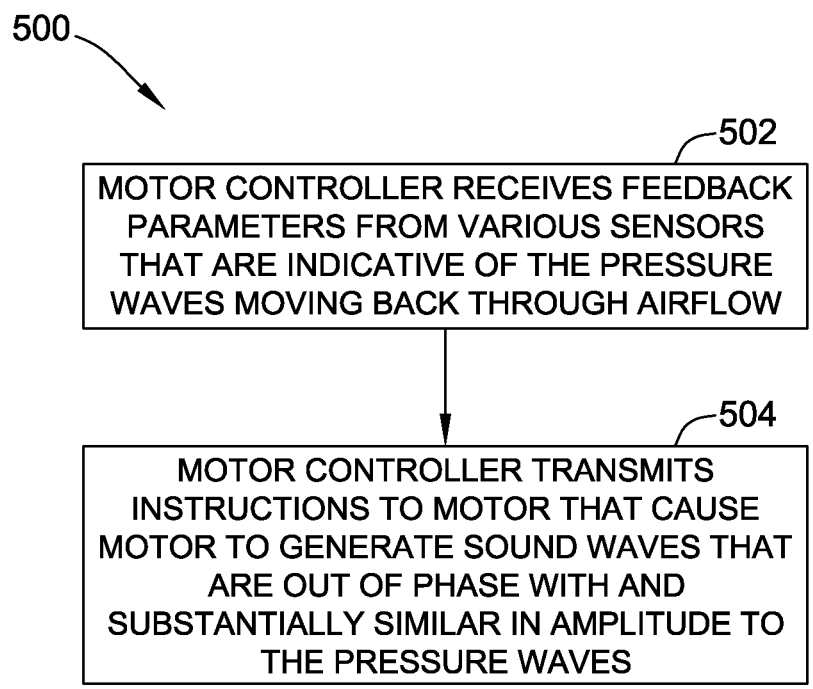
FIG. 5 a flow chart of an example process performed by a motor controller in accordance with one aspect of the present disclosure.

FIG. 5 is a flow chart of an example process 500 performed by motor controller 52 in accordance with one aspect of the present disclosure. Fluids are a communicating medium and communicate through pressure disturbances (i.e., noise). In the exemplary embodiment, downstream conditions of airflow 100 are communicated back through airflow 100, thereby affecting upstream flow dynamics of airflow 100. If the communication process is prevented or stopped, the flow dynamics of airflow 100 can be improved and become more uniform. In the exemplary embodiment, motor controller 52 is used to inject anti-noise, via motor 20, into airflow 100 to facilitate preventing some of the downstream communication and therefore interrupt the physics of airflow 100 into upstream flow conditions that are less or no longer affected by downstream flow restrictions.

As airflow 100 impinges on an downstream object, for example, without limitation, an AC evaporator roil, a louvered vent, etc., particle interactions within airflow 100 generate noise, i.e. pressure waves, that is communicated back through airflow 100. The noise is characterized by an alternating pressure waves in airflow 100, for example, compression phases and rarefaction phases. The compression and rarefaction phases are a consequence of the change in velocity of airflow 100 as it impinges on a downstream object in centrifugal blower system 1. The compression and rarefaction phases generally alternate in a cyclical fashion, and in some instances, at one or more audible frequencies. The pressure waves are communicated back through airflow 100 toward impeller 16, where they interact with air coming off impeller 16, and can lead to the formation of adverse flow structures. As these adverse flow structures move downstream, they increase in size and adversely affect the efficiency and noise level of centrifugal blower system 1.

In the exemplary embodiment, motor controller 52 receives 502 feedback parameters 60 from various sensors 62 (e.g., pressure and/or audio sensors) that are indicative of the pressure waves moving back through airflow 100. In response, motor controller 52 transmits 504 instructions 54 to motor 20 that cause motor 20 to generate pressure waves that are out of phase with and substantially similar in amplitude to the pressure waves, thereby facilitating canceling the noise. Actively canceling the pressure waves that communicate downstream flow restrictions facilitates creating a virtual flow field downstream and enables centrifugal blower system 1 to operate at an increased efficiency level. Additionally, actively canceling the pressure waves facilitates decreasing the formation of adverse flow structures in airflow 100, thereby facilitating increasing the uniformity of airflow 100. In the exemplary embodiment, at least a portion of the motor 20 acts as a pressure wave generating device to facilitate generation of the pressure waves. In some embodiments, centrifugal blower system 1 includes at least one pressure wave generating device that is separate from motor 20.

Figure 6:
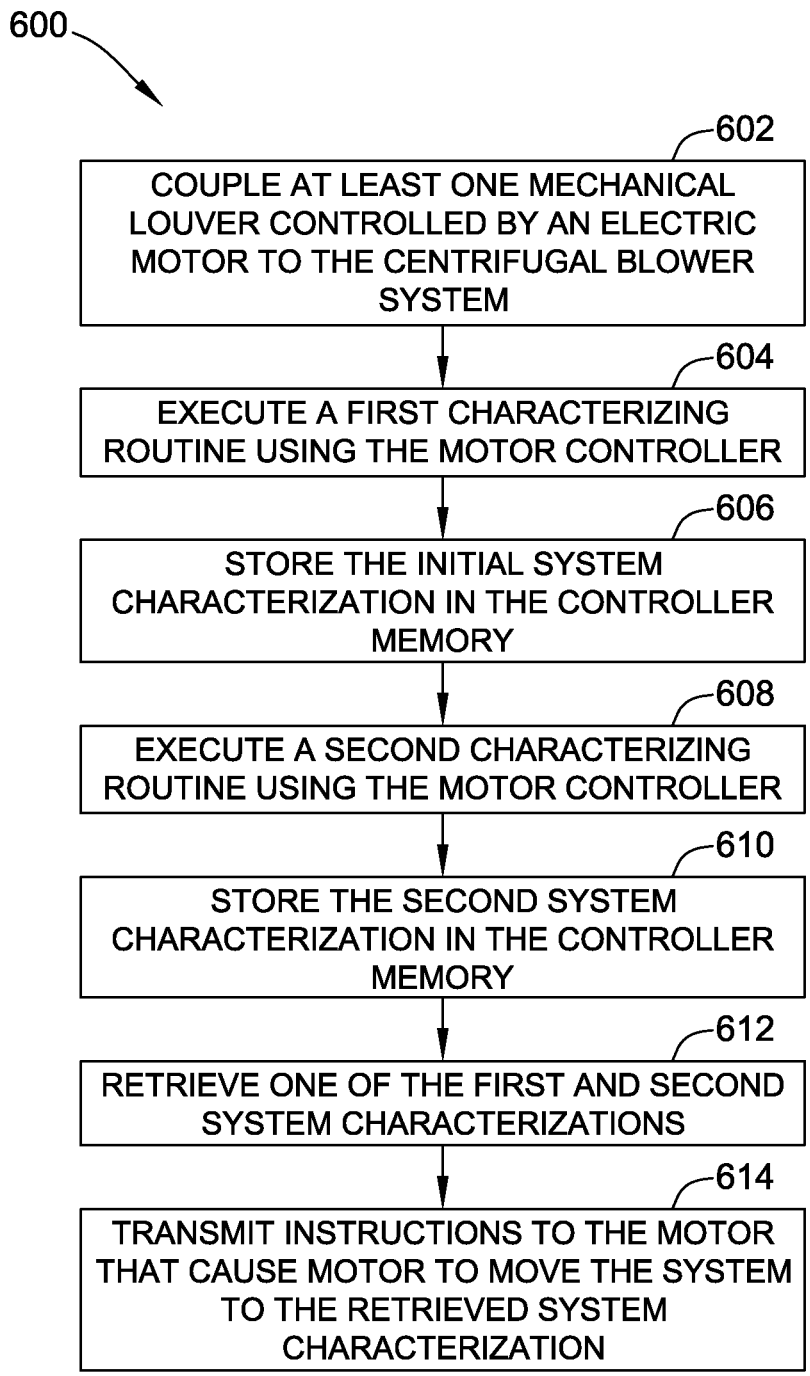
FIG. 6 is a flow chart of another example process performed by the motor controller in accordance with one aspect of the present disclosure.

FIG. 6 is a flow chart of another example process 600 performed by motor controller 52 in accordance with one aspect of the present disclosure. In this embodiment, centrifugal blower system 1 includes at least one mechanical louver 64 that is controlled, i.e., opened and closed, by an electric motor 66 (shown in FIG. 2). Electric motor 66 is coupled 602 to motor controller 52 such that motor controller 52 can receive feedback parameters 60 from electric motor 66, and control operation of electric motor 66 using instructions 68. For example, electric motor 66 is coupled to communication interface 312 of computing device 58 included in motor controller 52 via one of a wireless or wired connection. Electric motor 66 is controlled by motor controller 52 to facilitate tuning centrifugal blower system 1, wherein noise within centrifugal blower system 1 is generally decreased and the efficiency of centrifugal blower system 1 is generally increased. For example, motor controller 52 can adjust electric motor 66 to either open or close mechanical louver 64 to facilitate moving centrifugal blower system 1 off an unstable operating point.

When airflow 100 is forced through application ductwork 14 by centrifugal blower assembly 10, depending on airflow 100 velocities and particle interaction within airflow 100, there are certain operation points in centrifugal blower system 1 that are more stable than others. In some embodiments, changing a downstream restriction, for example, mechanical louver 64, to reroute airflow 100 or effect the flow distribution of airflow 100 improves the overall centrifugal blower system 1 performance. In the exemplary embodiment, sensors 62 sense instabilities in airflow 100 and transmit feedback parameters 62 to motor controller 52. Furthermore, electric motor 66 transmits feedback parameter 60, which is indicative of pulsating forces and vibrations within electric motor 66, to motor controller 52. Such pulsating forces and vibrations in electric motor 66 are generally the result of unsteady flow regions in airflow 100 and the interaction of airflow 100 with portions of ductwork 14 and/or mechanical louvers 64. The unsteady flow regions are variable, depending on many factors including pressure and flow velocity within airflow 100. Additionally, once centrifugal blower system 1 is in operation, changes in ambient conditions of airflow 100 can lead to various instabilities that can then be dynamically sensed by sensors 62 and feedback to motor controller 52 as feedback parameters 60. Should the sensed instabilities exceed a predetermined threshold; motor controller 52 can then again move off the unstable operation points.

In the exemplary embodiment, the pressure and flow velocity of airflow 100 is controlled by centrifugal blower system 1, and more particularly, motor controller 52. Motor controller 52 is configured to both statically and dynamically move the operation point of centrifugal blower system 1 to a position where it produces reduced noise and experiences reduced flow disturbance. In the exemplary embodiment, motor controller 52 executes 604 a characterizing routine including operating centrifugal blower assembly 10 and one or more mechanical louvers 64 within application ductwork 14 to generate an initial system characterization, which is stored 606 in memory area 304 of computing device 58 included in motor controller 52. For example, without limitation, motor controller 52 operates motor 20 of centrifugal blower assembly 10 at multiple speeds and operates mechanical louvers 64 through various configurations to generate an initial operating point for centrifugal blower system 1. After the initial operating point is stored in memory area 304, motor controller 52 can execute 608 additional characterizing routines to identify additional stable points within predefined operating parameters of centrifugal blower system 1. Each one of the identified stable points in stored 610 in memory area 302. During operation, should centrifugal blower system 1 become unstable or generate excessive noise that exceeds a predetermined threshold, as indicated by feedback parameters 56 and 60, motor controller 52 can retrieve 612 a different stable point and transmit 614 instructions 54 to motor 20 that cause motor 20 to move centrifugal blower system 1 to such stable point to facilitate increasing efficiency and reducing noise in the system.

The methods and systems described herein may be implemented using computer programming or engineering techniques including computer software, firmware, hardware or any combination or subset thereof, wherein the technical effect may include at least one of: (a) receiving a first feedback parameter from a sensor, wherein the first feedback parameter is indicative of a pressure wave moving through the airflow; (b) transmitting a first instruction to the motor, wherein the first instruction is based on the first feedback parameter; and (c) causing the motor to generate at least one axis of vibration configured to cancel the pressure wave.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, including RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications, or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

As compared to known systems and methods for reducing noise in a blower system, the systems and methods described herein enable the motor controller to receive feedback of various physical conditions of the system and airflow and to adaptively determine a set of parameters and operating conditions that enable the system to operate in a given environment in a more efficient manner and while generating reduced noise. Accordingly, added time and cost associated with manually tuning parameters and structurally tuning the physical properties of the system is eliminated.

The methods and systems described herein facilitate reducing noise in a centrifugal blower system using the motor controller to inject signals that cause the blower motor to respond by generating anti-noise. In one suitable embodiment, a centrifugal blower system includes a centrifugal blower assembly for generating airflow. The centrifugal blower assembly includes a housing, a motor coupled to the housing, and an impeller coupled to said motor. The centrifugal blower system also includes a motor controller coupled to the motor. The motor controller is configured to receive at least one feedback parameter transmitted by a sensor coupled to the centrifugal blower system. The motor controller is further configured to transmit instructions to the motor based on the at least one feedback parameter.

Exemplary embodiments of a centrifugal blower system are described above in detail. The centrifugal blower system and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

This written description uses examples to provide details on the disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A centrifugal blower system comprising:
   a centrifugal blower assembly for generating airflow, said centrifugal blower assembly comprising a housing, a motor coupled to said housing, and at least one impeller coupled to said motor, said motor configured to rotate said at least one impeller and oriented to generate a first pressure wave during operation of said motor;
   a sensor configured to detect the first pressure wave and send a first feedback parameter indicative of the first pressure wave to
   a motor controller communicatively coupled to said sensor to receive the first feedback parameter, said motor controller further communicatively coupled to said motor to enable said motor to generate and send a second feedback parameter to said motor controller, said motor controller configured to receive the second feedback parameter from said motor and determine an operational status of said motor, said motor controller also configured to transmit instructions to said motor to control an operation of said motor based on at least one of the first feedback parameter and the second feedback parameter,
   wherein said motor is configured to receive the instructions and generate a second pressure wave that is out of phase with the first pressure wave and substantially similar in amplitude to the first pressure wave.

2. The centrifugal blower system in accordance with claim 1, wherein said sensor comprises at least one of an audio sensor and a pressure sensor.

3. The centrifugal blower system in accordance with claim 1, wherein the operation of said motor generates vibrations that are transmitted through surfaces adjacent to said motor, the surfaces vibrating at a resonant frequency configured to generate anti-noise.

4. The centrifugal blower system in accordance with claim 1, wherein said motor is operated to generate said second pressure wave to improve airflow efficiency in said centrifugal blower system.

5. The centrifugal blower system in accordance with claim 1, further comprising a pressure wave generating device to facilitate the generation of pressure waves during operation of said motor.

6. The centrifugal blower system in accordance with claim 1, further comprising at least one mechanical louver coupled to a second electric motor, said second electric motor coupled to said motor controller and configured to transmit at least one third feedback parameter to said motor controller, and to receive control instructions from said motor controller.

7. The centrifugal blower system in accordance with claim 6, wherein said second electric motor transmits the at least one third feedback parameter to said motor controller via a wireless connection.

8. The centrifugal blower system in accordance with claim 1, further comprising a blower expansion coupled to said housing and an application ductwork coupled to said blower expansion, wherein the airflow from said centrifugal blower assembly is channeled through said blower expansion to said application ductwork.

9. The centrifugal blower system in accordance with claim 8, wherein said sensor is coupled in communication with said application ductwork to determine a physical characteristic of at least one of said application ductwork and the airflow.

10. The centrifugal blower system in accordance with claim 9, wherein the first feedback parameter is indicative of unwanted pressure waves, and said motor controller comprises a processor programmed to determine, based on the first feedback parameter, instructions that cause said motor to generate pressure waves out of phase with the unwanted pressure waves sensed in said centrifugal blower system.

11. A centrifugal blower system comprising:
    a centrifugal blower assembly for generating airflow, said centrifugal blower assembly comprising at least one impeller, a motor configured to rotate said impeller and oriented to generate a first pressure wave to move through the airflow of the centrifugal blower system; and
    a motor controller configured to receive a first feedback parameter and transmit a first instruction based on the first feedback parameter, the first feedback parameter indicative of the first pressure wave,
    wherein said motor is configured to receive the first instruction and generate a second pressure wave that is out of phase with the first pressure wave to cancel the first pressure wave.

12. The centrifugal blower system in accordance with claim 11, further comprising at least one sensor configured to sense a pressure wave in the airflow and provide the first feedback parameter to said motor controller.

13. The centrifugal blower system in accordance with claim 11, further comprising application ductwork for channeling the airflow generated by said centrifugal blower assembly, said application ductwork coupled to said centrifugal blower assembly.

14. The centrifugal blower system in accordance with claim 13, further comprising at least one sensor configured to transmit the first feedback parameter, the at least one sensor coupled to said application ductwork.

15. The centrifugal blower system in accordance with claim 11, wherein said motor is further configured to transmit a second feedback parameter, the second feedback parameter indicative of back electromotive force (BEMF) harmonics generated by said motor.

16. The centrifugal blower system in accordance with claim 15, wherein the motor controller is further configured to transmit a second instruction to said motor based on the second feedback parameter and said motor is further configured to generate vibrations in response to the second instruction, the vibrations configured to cancel the BEMF harmonics.

17. A method for reducing noise in a centrifugal blower system, the centrifugal blower system comprising a motor, at least one impeller coupled to the motor, the motor configured to rotate the impeller, and a motor controller coupled to the motor, the method comprising:
    receiving predefined operating parameters of the centrifugal blower system;
    executing a first characterizing routine using the motor controller, the first characterizing routine configured to operate the motor at multiple speeds to determine a first operating state of the centrifugal blower system based on the predefined operating parameters, the first operating state including a first motor speed;
    executing a second characterizing routine using the motor controller, the second characterizing routine configured to operate the motor at multiple speeds to determine a second operating state of the centrifugal blower system based on the predefined operating parameters, the second operating state including a second motor speed;
    storing the first operating state and the second operating state;
    transmitting an instruction to the motor; and
    moving the centrifugal blower system to either the first operating state or the second operating state in response to the instruction.

18. The method in accordance with claim 17, further comprising transmitting a first feedback parameter relating to the centrifugal blower system to the motor controller, the first feedback parameter indicative of a physical characteristic of at least one of the centrifugal blower system and airflow through the centrifugal blower system.

19. The method in accordance with claim 18, further comprising transmitting a second feedback parameter to the motor controller, the second feedback parameter indicative of a physical characteristic associated with a mechanical louver.

20. The method in accordance with claim 19, wherein executing the first and second characterizing routines comprise instructing the motor to move the mechanical louver from an opened configuration to a closed configuration, sensing instabilities in the airflow using the first feedback parameter and the second feedback parameter, and determining a position of the mechanical louver when the instability in the airflow is at a minimum.

21. The method in accordance with claim 17, further comprising receiving a feedback parameter from a sensor or the motor, determining whether instabilities in the airflow exceed a predetermined threshold, retrieving the other of the first and second operating states if the instabilities in the airflow exceed the predetermined threshold, and moving the centrifugal blower system to the other of the operating states in response to the instructions.

22. The method in accordance with claim 21, wherein receiving a feedback parameter from a sensor or the motor comprises receiving a feedback parameter from at least one sensor coupled to the centrifugal blower system.

* * * * *